Dec. 31, 1968      B. W. BURGESS ET AL      3,418,723
                   TURBULENT DRYING PROCESS

Filed Oct. 27, 1965

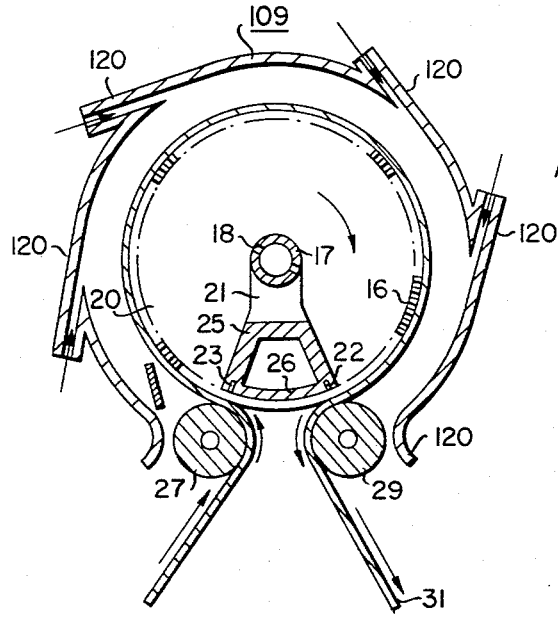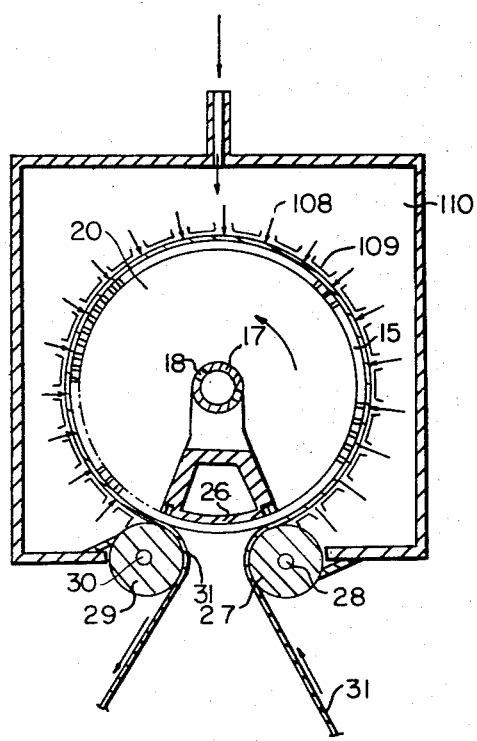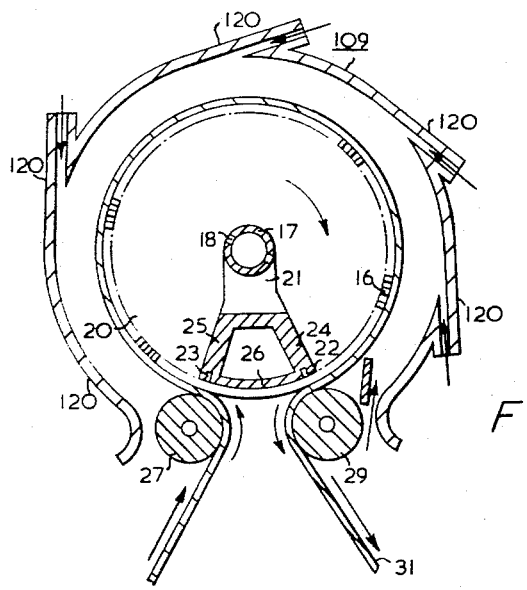

3,418,723
TURBULENT DRYING PROCESS
Bernard W. Burgess, Senneville, Quebec, and Stuart M. Chapman, Beaconsfield, Quebec, Canada, assignors to Pulp and Paper Research Institute of Canada, Montreal, Quebec, Canada
Filed Oct. 27, 1965, Ser. No. 505,383
Claims priority, application Great Britain, Oct. 27, 1964, 43,872/64
10 Claims. (Cl. 34—1)

ABSTRACT OF THE DISCLOSURE

The present invention provides an improvement in a process for drying wet material, such as a continuous water-wet web, e.g. paper. It was known to dry the material by substantially simultaneously subjecting the material to percolation of hot gases through the material by means of a difference in gaseous pressure between two faces of the material, and to heating by means of radiation and also by means of convection. The inventive contribution resides in providing the convection by means of a hot gas, e.g. at a temperature of 400° F. or more, having a velocity which is sufficient to create a turbulent condition at the area where it impinges on, or contacts, the material being dried, e.g. a velocity of 100 ft./sec. or more.

---

This invention relates to a process for the drying of materials, whether in the form of mats of discrete particles or continuous porous webs (herein referred to simply as "material"). More particularly, it is directed to a process for the drying of continuous webs of paper, textiles and the like.

According to the method most commonly followed up to the present time for drying paper and paperboard, the wet web is passed around a series of internally-heated cylinders (known as "dryers") with the web in contact with a segment of each dryer and usually held against it by a dryer felt that is under tension. One of the chief disadvantages of this method is the multiplicity of dryers required to accomplish the drying operation to a satisfactory degree and this necessitates costly capital equipment, a great deal of space, and considerable maintenance.

A further disadvantage is that this method requires the exhaust of large quantities of heated scavenger air to promote the removal of the evaporated moisture. It is not uncommon to use between 20 and 70 tons of such air per ton of product dried and this involves an expenditure of energy to heat the scavenger air and to move it through the dryers. Furthermore it is essential that as much heat as possible be recovered from this air by the installation of expensive hoods and heat recovery equipment. Even the use of such large quantities of heated air does not completely and uniformly remove the evaporated moisture from the pockets defined by the moving web, the dryers and the dryer felts. High humidity conditions exist in these pockets, thus impeding the drying process as well as causing uneven drying. Another difficulty with this conventional method is the problem of establishing a sufficiently high heat transfer rate between the dryers and the sheet because of the poor heat conduction from said dryers to the web resulting from the entrainment of air and the generation and accumulation of steam between the web and the dryer surface, this accumulation tending to lift the web off the dryers. These difficulties not only adversely influence the drying capacity of dryers and thereby necessitate a multiplicity of dryers, but also give rise to uneven drying of the web.

Another method sometimes used for drying paper is the "Minton Dryer" in which the web passes over a series of internally-heated cylinders that are placed inside a vacuum chamber. This has the advantage that the moisture evaporated from the web is removed continuously by the vacuum system. The method has the disadvantage that it does not ensure intimate contact of the web with the drying cylinder and therefore does not provide satisfactory heat transfer. In addition, the Minton Dryer has a number of operating difficulties, the chief of which stems from the necessitity of breaking the vacuum seal when a break in the web being dried occurs.

While the present invention is not to be limited to any particular theory, it is believed that in the drying of materials, two major processes take place, namely: transfer of heat to the substance being dried (i.e. heat transfer) and transport of the evaporated vapours away from the substance (i.e. mass transfer). The heat transfer process is dependent, inter alia, upon the temperature difference between the heat source and the material being dried and, in many instances on the boundary layer conditions. The vapour pressure gradient between the evaporating surfaces and the ambient atmosphere provides the driving force for the mass transfer process. It is preferable to provide a high temperature difference combined with a high vapour pressure difference so as to obtain high rates of drying. Also, it is preferable to reduce the influence of the boundary layers between the material and the heat source and between the material and the ambient atmosphere in order to increase the rates of heat and mass transfer and therefore the rate of drying.

According to one broad aspect of the present invention, an improved process is now provided for drying either a porous mat of discrete material or a continuous porous web, e.g. paper, textiles or the like. This process is an improvement on the known processes of drying wet porous material in which the material is substantially simultaneously subjected to percolation of hot gases through the web by a difference in gaseous pressure between the two faces of the web, and to heating both by radiation, e.g. by a hot surface, or by radiant heaters, and by convection, e.g. by a hot moving gas. The improvement resides in providing the convection by means of a hot gas, e.g. at a temperature of 400° F. or higher, having a velocity which is sufficient to create a turbulent condition at the area where the gas impinges on, or contacts, the material being dried, e.g. a velocity of 100 ft./sec. or more.

The gas may impinge on, or contact, the material being dried at an angle thereto, e.g. up to 90°, or tangentially, either in the direction of travel of the material (cocurrent), or against the direction of travel of the material (countercurrent).

One advantage of the procedure provided by this invention is that the material being dried is subjected to conditions which aid heat transfer while at the same time it is subjected to conditions of high mass transfer through the simultaneous application to the material of heat and percolation through the material by means of the pressure differential acros the material. This tends to increase the rate of drying of the material.

It is a further advantage of the procedure provided by this invention that the thicknesses of the boundary layers tend to be reduced and thereby the resistance to heat transfer to, and mass transfer from, the material of such boundary layers is decreased.

This passage of gases through the material has a further advantage in that it aids evaporation by helping to carry the heat into, and the evaporated moisture out of, the interstices of the material.

The influence of the boundary layer in the transfer of heat by radiation is normally less than in convection drying. Thus, when heating of the material is provided partially by radiant energy, as taught by the procedure of the present invention, the influence of any remaining boundary layer is less significant.

Yet another advantage of the procedure taught by this invention is that dryer felts are not required to ensure intimate contact between the heat source and the material, thus saving the cost of the felts.

The heating elements or sources of heat used in the procedure taught by the present invention include the following:

(1) Infrared

Infrared dryers depend on the transfer of radiant energy from a hot surface in order to evaporate moisture. This energy may be generated electrically, for example in incandescent lamps, or by incandescent refractories heated by a fossil fuel, such as gas. The latter method has the added advantage of also providing convection heating, which may be appreciable. The radiant energy generated may be reflected and/or directed by means of suitable reflectors. Suitable infrared heaters include such equipment manufactured by General Electric Co., and by Red-Ray Manufacturing Co. The surface temperature of these units is generally high, usually in excess of 1000° F. Such high temperatures result in a high rate of heat output. The transfer of this radiant energy to the material being dried may not be hindered appreciably by the moisture-laden air-film at the surface, since this film may be penetrated by infrared radiation of suitable wave length.

(2) Dielectric

The fundamental characteristic of dielectric heaters is of generating heat within a solid.

In dielectric drying, the material to be dried is heated by placing it in a strong electrostatic field produced by high-frequency voltage. In its simplest form, such a dryer might consist of two flat metallic plates between which lies the material to be dried. Such a combination represents a capacitor, the plates of which are connected to the terminals of a high-frequency electronic generator. During one portion of the electrical cycle, the upper plate is charged positively and the lower plate negatively, thereby creating a stress in one direction on the molecules of the wet material, which acts as the dielectric of the capacitor. A half-cycle later, the polarities of the plates are reversed, thereby reversing the atomic or molecular stress in the dielectric or wet material. This reversal of polarity occurs with extreme rapidity, corresponding to the frequency of the electronic generator, which may be in the range of 1 to 100 megacycles ($1 \times 10^6$ to $100 \times 10^6$ cycles/sec.).

Alternatively, it may consist of a plurality of metallic plates disposed in spaced-apart, side-by-side relation in essentially the same plane, contiguous plates being opposite polarities. Suitable dielectric heaters include such equipment which is manufactured by General Electric Co., by Allis-Chalmers, by Reeve Electronic and by Young Brothers.

The heating is carried throughout the thickness of the wet material. It provides an ideal temperature and vapour pressure gradient, from inside of the material out and the heating is carried on substantially irrespective of any insulating influence of the moisture-laden air film at the surface of the material. No intermediate heat storage is required as in the case of convection and conduction dryers and instantaneous control of dielectric heating is possible.

A further advantage is the fact that the power is dissipated at higher rates in the areas where the moisture content is the highest thereby, tending to maintain an even moisture profile.

(3) High frequency (induction) heating

In induction heating, the material to be heated is used as the secondary of a transformer, the primary coil being connected to the supply. The frequency of the power supply may be 10,000 cycles/sec. or more. Induction heaters which may be used include those manufactured by Allis Chalmers, by Reeve Electronic and by Young Brothers.

(4) Microwave

Microwaves are very short electromagnetic waves that fall between light and radio waves in length. They pass virtually undiminished through many materials, such as glass and most plastics, and are reflected almost entirely by metals. The energy contained in microwaves is turned into heat only when it is absorbed, as it is by the moisture. Microwave generators which may be used include such equipment manufactured by Raytheon Co., or by Litton Industries.

(5) High velocity hoods

Hot gases, preferably dry gases, are caused to contact the surface of the material being dried.

Conventional high velocity dryers, such as the Ross, Gardner, Spooner, Beloit or Black-Clawson hoods may be used, and these involve the projection of the hot gases through jets which are directed essentially normal to the surface of the moving material to be dried. The orifices are either holes or slots. Exit velocities of about 100 ft./sec. or more, may be used in the procedure taught by this invention. In effect, this velocity is sufficient to create a turbulent condition at the area where the hot gas impinges on, or contacts, the surface of the material being dried. Any other source of hot gases which directs the gases against the material at that velocity or greater may be used.

Alternatively, the gases may be directed to contact the moving material at an angle thereto, or tangentially, either co-currently or counter-currently to the moving material, the relative velocity of the hot gases with respect to the moving material being 100 ft./sec. or greater.

In the case of drying a mat of discrete material it may be necessary to provide means to inhibit the disruption of such mat by the high velocity gases.

(6) Heat by conduction

Conductive heat may be transmitted to the wet material by any conventional means that does not interfere with the movement of gases from the exposed surface to the supported surface. An example would be by heating the support means.

To summarize, therefore, the heating elements or sources of heat essential to the procedure of this invention include both: (1) heat by radiation in the range of wave lengths of 1 micron to 3 cms. (i.e. by radiant heating); and (2) heat by convection using a hot gas having a velocity sufficient to create a turbulent condition at the area where it impinges on, or contacts, the material being dried, e.g. by projecting a hot gas at a velocity of 100 ft./sec. or more so as to impinge on, or contact, the material being dried. In addition, optional heating elements or sources of heat may be used, such as: (3) microwave heating; (4) induction heating; (5) conduction heating; and (6) dielectric heating.

The source of heat by radiation may be, as indicated hereinabove, gas-fired radiant heaters, electric radiators, or any other means known to those skilled in the art. When a gas-fired radiant heater is used, as in one procedure taught by the present invention, the products of combustion constitute a source of heat by convection. Other sources of heat by convection may be from any suitable hot gas. Examples of such hot gases include hot air, hot flue gases and other similar gases, but in all cases, such gas is non-reactive with the material being dried.

The material being dried may be any wet material, for example, paper, paperboard, textiles, fiber glass, mats of material, etc. In addition, it is not essential for the material to be wet with water.

In the accompanying drawings,

FIGURE 4 is a diagrammatic cross-sectional view of a portion of an apparatus which may be used to provide both radiant and convection heating, according to a procedure of the present invention;

FIGURE 5 is a diagrammatic cross-section of an apparatus of another embodiment of this invention, based on the apparatus shown in FIGURE 4;

FIGURE 6 is a diagrammatic cross-section of an apparatus of yet another embodiment of this invention, based on the apparatus shown in FIGURE 4.

Figure 1:
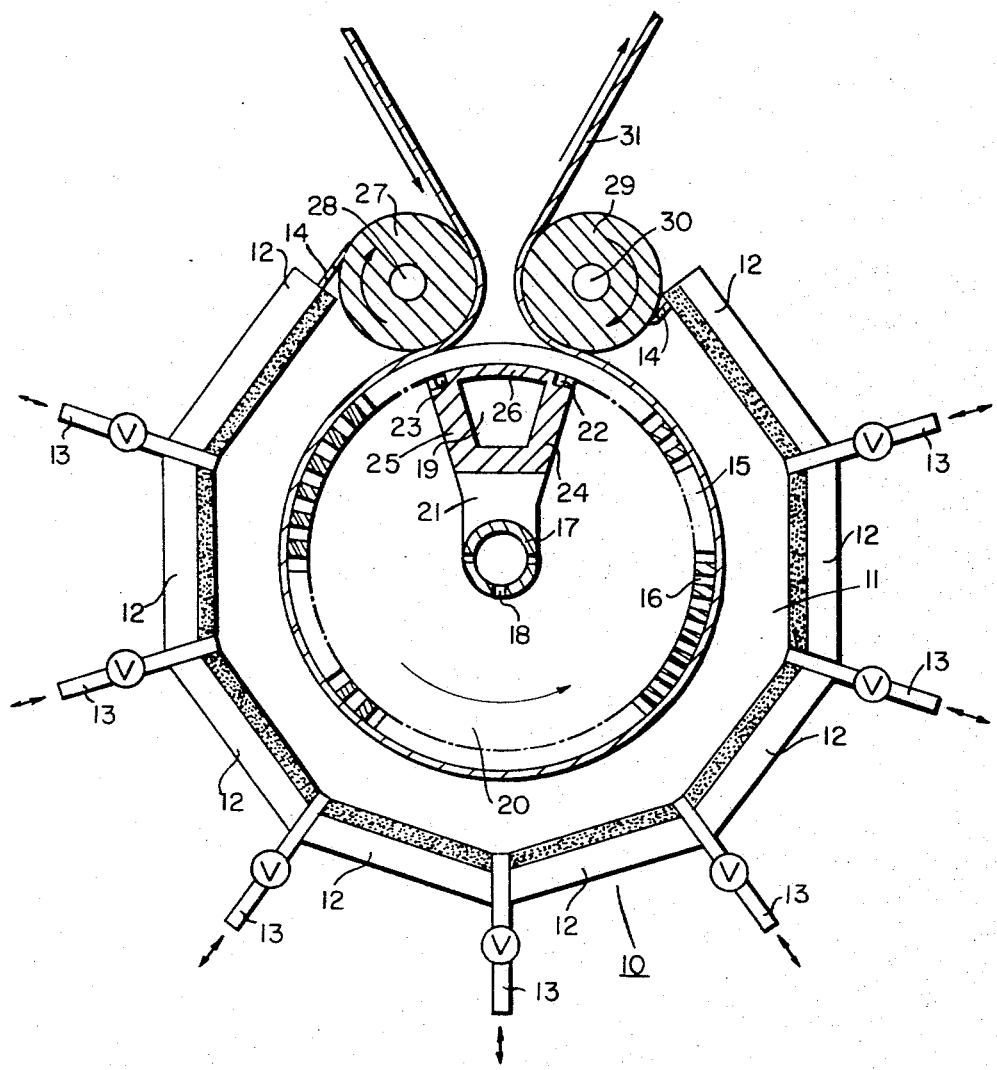
FIGURE 1 is a diagrammatic cross-sectional elevation of an apparatus according to one embodiment of the present invention for carrying out one procedure according to the present invention.

Turning to FIGURE 1, the apparatus 10 generally comprises an enclosed heating compartment 11 provided with a plurality of circumferentially disposed radiant heaters 12. Disposed between adjacent radiant heaters 12 are valved inlet lines 13 which are used for the auxiliary addition of heated air into the heating space and when necessary, to remove excess flue gases from the compartment 11. When the radiant heaters 12 are gas fired, as in an aspect of this invention, a substantial amount of the heat of the combustion gases which are formed is utilized in the drying, in that the bulk of the gases are drawn through the material into the evacuated zone 20. Seals 14 are provided for maintaining gas within the heating compartment 11.

Within the heating compartment 11 is a roller 15 rotatable counterclockwise and provided with a plurality of apertures 16, the size, number, and distribution of the apertures being selected according to principles known to those skilled in the art. While the roller 15 is shown as having a perforated shell, it may also have a foraminous shell. The perforated roller is designed so that the perforations do not extend completely to the outside edges thereof, i.e., it is provided with a pair of unperforated rings, whose purpose and function will be explained subsequently. The roller is rotatably mounted on a hollow shaft 17. The hollow shaft 17 is connected to a source of sub-atmospheric pressure (not shown). The evacuated zone 20 is connected to the source of sub-atmospheric pressure by means of apertures 18 in the shaft 17. A segment 19 of the interior of the roller may be maintained at atmospheric pressure since it can be separated from the remainder of the interior (evacuated zone) 20 thereof by means of a fork 21. Pressure seals 22, 23 extend from the two prongs 24, 25 of the fork 21 to the interior wall of the roller 15 and other seals 26 extend along the interior face of the cylindrical roller 15 between the prongs 24, 25 of the fork 21. Suitable means (not shown) seal the ends of the segment 19. A portion of the interior 20 of the roller thus becomes a chamber subjected on its interior to the influence of the sub-atmospheric pressure.

The apparatus also includes a primary guide roller 27 rotatable clockwise on a shaft 28 and a secondary guide roller 29 rotatable clockwise on its own shaft 30. The web 31 is entrained around rollers 27, 15 and 29.

In order to illustrate the start-up procedure for the process of an aspect of this invention, reference is now made to FIGURE 1. A narrow strip or tail (not shown) of the continuous web 31 is fed firstly around the primary guide roller 27, then around the rotating foraminous roll 15 and finally around the secondary guide roller 29 by guide or back-tender ropes according to a method commonly used for threading a web through a conventional paper drying machine. Once the tail has been fed around the roll 15 and the secondary guide roll 29, the width of the tail is increased until it equals the full width of the web 31. Thus, the web is gripped between roller 27 and roller 15, travels around roller 15 and then is gripped between roller 15 and roller 29. The full width of the web 31 is less than the width of the roller 15 but greater than the width of the perforated area of said roller 15. The side edges of the web rest on the unperforated edge rings of the roller 15, thus helping to maintain the interior 20 of the roller 15 under sub-atmospheric pressure. The sub-atmospheric pressure would normally be applied to the inside 20 of the foraminous roller 15 at this time, but could be applied earlier if, for example, there was a tendency for the web 31 to drop away from the roller 15. Alternatively, the web 31 may be placed on the foraminous roller 15, while it is subjected to sub-atmospheric pressure, in which case such sub-atmospheric pressure will cause the web 31 to adhere to the roller 15 and the rotation of the roller 15 will then lead the web 31 through the apparatus.

Figure 2:
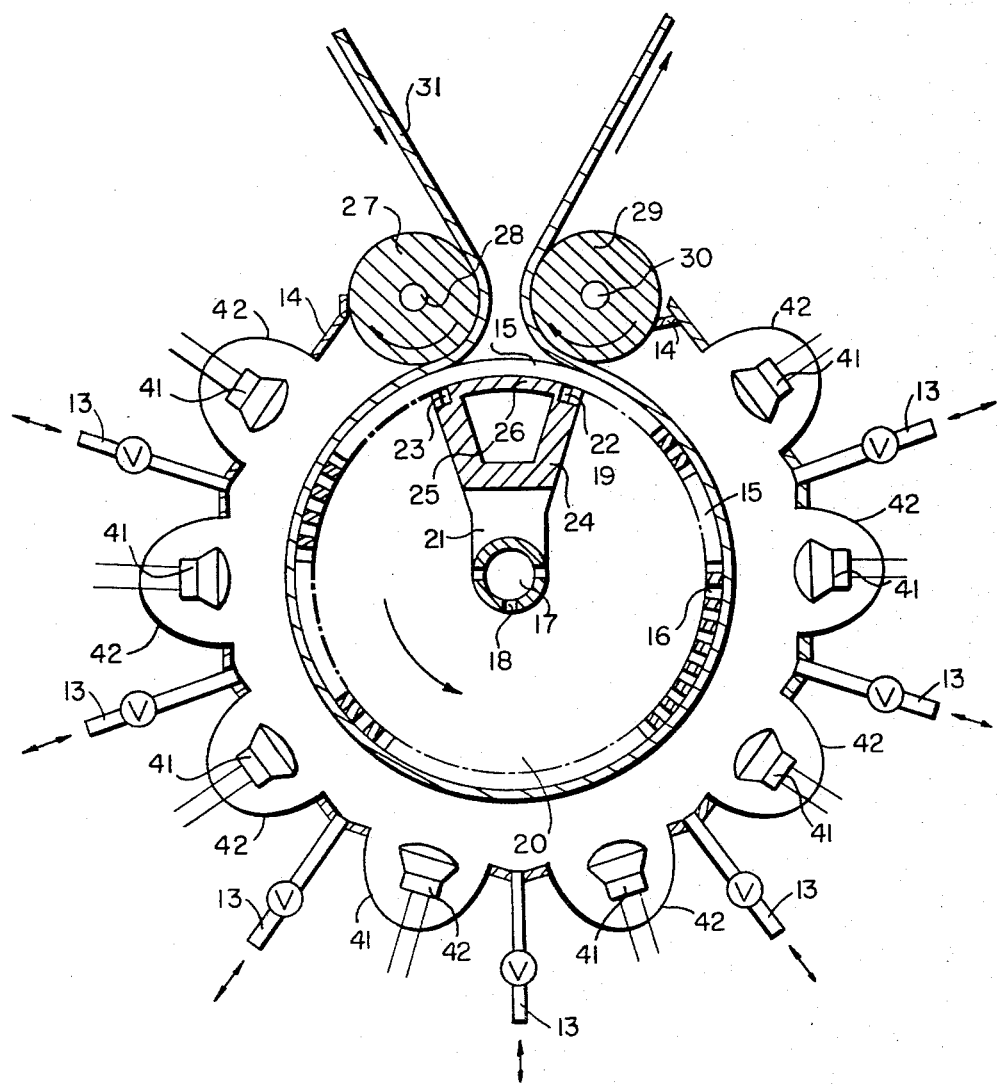
FIGURE 2 is a diagrammatic cross-sectional elevation of an apparatus according to another embodiment of the present invention, for carrying out another procedure of the present invention.

The embodiment of FIGURE 2 shows the use of infrared lamps 41 for the provision of radiant heat. The infrared lamps 41, in this case spaced circumferentially around the roller 15, are shielded by parabolic reflectors 42 in order to provide the maximum utilization of the heat flux.

Figure 3:
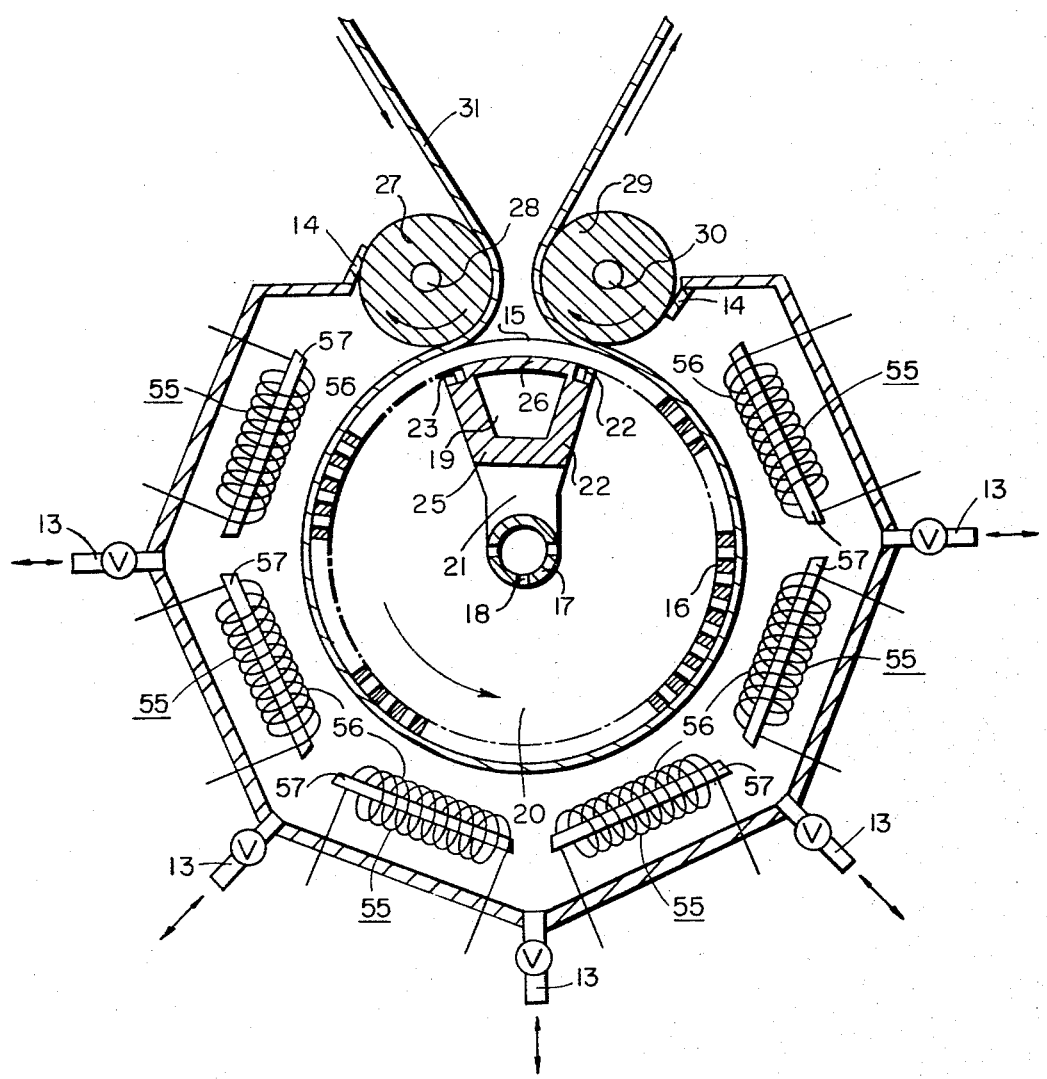
FIGURE 3 is a diagrammatic cross-sectional elevation of a portion of an apparatus which may be used to provide optional auxiliary heating (namely, induction heating) in the procedure of another aspect of this invention.

The embodiment of FIGURE 3 shows the use of supplementary induction heaters 55. The induction heaters 55 are each provided by a coil of wire 56 connected to a source of A.C. power and wound around a core 57. The heater comprises six coils disposed around the outer periphery of the roll, but the induction heating may be provided by having the coils 55 disposed in the interior of the roller 15. In addition, such induction heaters 55 may be provided both in the interior 20 and at the exterior of the roller 15. In these embodiments, the roller 15 may be made of electrically non-conductive material. The induction heaters are used in addition to the radiation heaters and the convection heaters following the procedure of this invention.

FIGURE 4 depicts diagrammatically another apparatus for carrying out the procedure of an embodiment of this invention. The apparatus consists of a drying vessel 110. Within the drying vessel is a foraminous or perforated hollow cylinder 15 containing the sub-atmospheric pressure chamber 20. Cylinder 15 is identical with roller 15 in FIGURE 1.

The material to be dried 31, passes in the nip between primary roller 27 and cylinder 15 passes around cylinder 15 and then in the nip between cylinder 15 and secondary roller 29. It is subjected to the influence, simultaneously, of the sub-atmospheric pressure within cylinder 15 and a high velocity blast of hot gases, indicated diagrammatically by arrows 108 emanating from a high velocity gas hood, indicated diagrammatically by 109. The gas is in turbulent flow and impinges on, or contacts, the material at a velocity of about 100 ft./sec. or higher and at a temperature of about 400° F. or higher.

FIGURES 5 and 6 illustrate two different units for carrying out the procedure of the embodiment described with reference to FIGURE 4. It is noted that in both FIGURES 5 and 6, the roller 15 is rotating in a clockwise direction. In FIGURE 5, the high velocity drying gases are directed tangentially against the moving web 31 by means of inlet tubes 120 so that the gases flow countercurrently to the movement of the web 31.

On the other hand, in FIG. 6, the high velocity drying gases are directed tangentially against the moving web 31 by means of inlet tubes 120 so that the gases flow co-currently with the movement of the web 31.

It is essential according to the procedure taught by the present invention that there be a gaseous pressure differential between the chamber 11 and within interior 20 of the roller 15, i.e., that there be a positive flow of gas from the chamber 11, through the material 31 being dried and into the interior 20 of the roller 15. This provides for percolation of gases through the material being dried. Such gaseous pressure differential may be achieved in five ways: (1) atmospheric pressure in the chamber 11 and sub-atmospheric pressure within the interior 20 of roller 15; (2) super-atmospheric pressure in the chamber 11 and atmospheric pressure within the interior 20 of the roller 15; (3) super-atmospheric pressure in the chamber 11 and sub-atmospheric pressure within the interior 20 of the roller 15; (4) sub-atmospheric pressure in the chamber 11 and still lower sub-atmospheric pressure within the interior 20 of the roller 15; and (5) super-atmospheric pressure in the chamber 11 and less super-atmospheric pressure within the interior 20 of the roller 15.

As used in the present specification the condition of a difference in gaseous pressure between the two faces of the web is meant to be achieved by any one of the five alternatives mentioned above. Thus, while many of the embodiments shown use alternative (1) above, the other alternatives may also be used. While FIGURES 5 and 6 use alternative (3) above, alternative (2) may also be used.

It will be observed that the process of this invention and the apparatus specially adapted to carry out such process have ben mainly described with reference to a single perforated supporting means and a single series of heat sources. However, other variations may be made. Thus, the material may be passed in supported contact with a series of consecutive foraminous supporting means in a single heated vessel. Alternatively, the material may be passed consecutively through a series of units, each containing but one foraminous support. The wet material may also be passed consecutively through a series of units, each provided with a series of consecutive foraminous supporting means.

It will be noted that in all the embodiments the heating elements or the source of heat is shown to be fixed. It is within the scope of this invention to provide means for varying the distance between the heating elements or the source of heat and the material being dried. This is a more particularly advantageous embodiment of this invention where the heating elements or the source of heat are radiant heat and convective heat.

Among the tests carried out following the teachings of the procedure of this invention were several to determine the influence of temperature and the influence of sub-atmospheric pressure on the drying rate when the heat source was heated air, at a velocity of 200 f.p.s. The air was blown across the exposed surface of paper whose initial moisture content was 200% dry basis. The supported surface was exposed alternately to sub-atmospheric pressures of 2″ Hg, 4″ Hg, and 10 Hg. The temperature was varied between about 110° F. and about 600° F.

Figure 7:
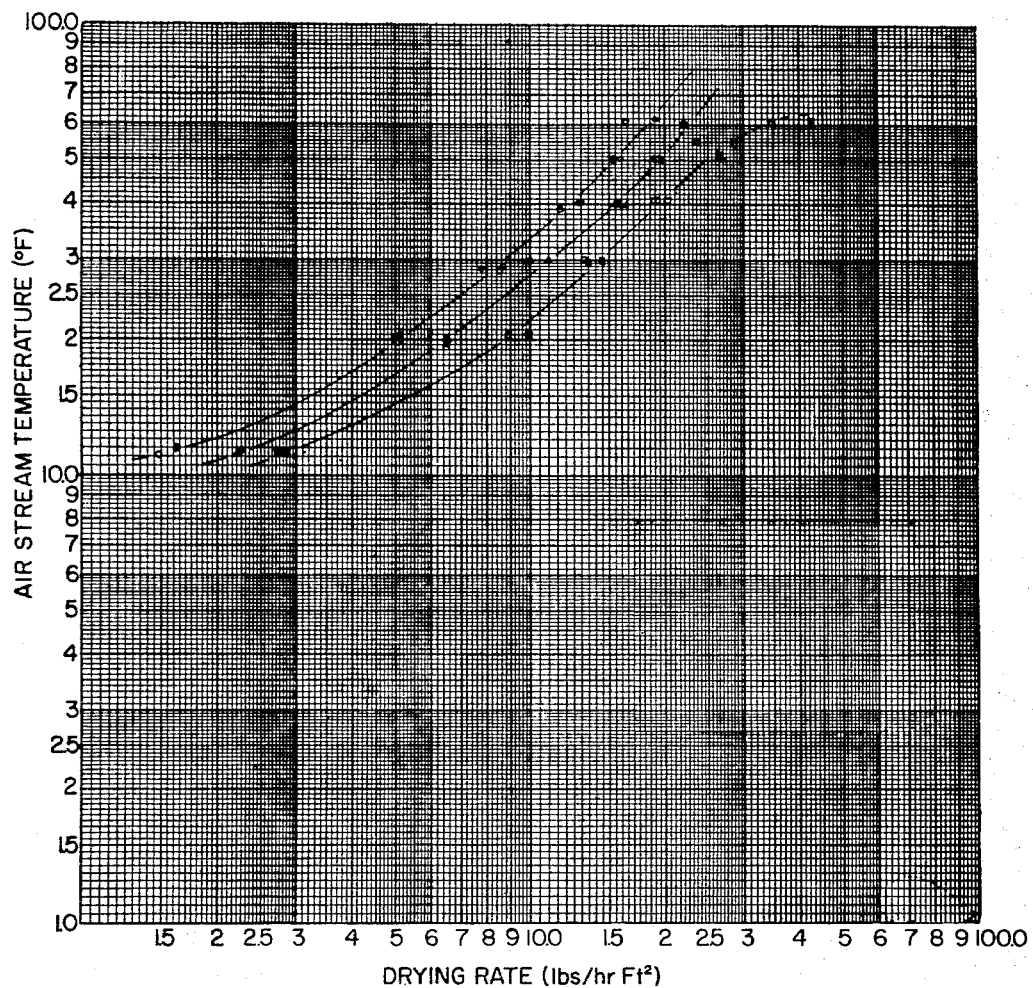
FIGURE 7 is a graph drawn on a log-log scale of drying rate in lbs./hr./ft.$^2$ as abscissa and air stream temperature in °F. as ordinate.

The results are shown in FIG. 7 which shows a substantial increase in drying rate attendant on the sub-atmospheric pressure.

The curve through points marked ○ was at sub-atmospheric pressure level of 2″ Hg; that marked △ was at sub-atmospheric pressure level of 4″ Hg; and that marked □ was at sub-atmospheric pressure level of 10″ Hg.

We claim:
1. In a process for drying wet porous material in which the material is substantially simultaneously subjected to percolation of hot gases through the material by a difference in gaseous pressure between two faces of the material and to heating by radiation and by convection, the improvement comprising providing the convection by means of a hot gas having a velocity sufficient to create a turbulent condition at the area where it impinges on the material being dried.

2. The process of claim 1 wherein the hot gas emerges from a jet and has a jet nozzle velocity of at least 100 ft./sec.

3. The process of claim 1 wherein the hot gas is at a temperature of at least 400° F.

4. The process of claim 1 wherein the wet porous material is a continuously moving paper web, and the hot gas is hot air.

5. The process of claim 4 wherein the hot air emerges from a jet and has a jet nozzle velocity of at least 100 ft./sec. and has a temperature of at least 400° F.

6. The process of claim 1 wherein the hot gas selectively contacts the web in one of the following directions: perpendicularly to the web; tangentially cocurrent to the direction of movement of the web; and tangentially countercurrent to the direction of movement of the web.

7. The process of claim 5 wherein the hot air selectively contacts the web in one of the following directions: perpendicularly to the web; tangentially cocurrent to the direction of movement of the web; and tangentially countercurrent to the direction of movement of the web.

8. The process of claim 1 including additionally heating the material with the aid of the following heating methods: microwave heating; induction heating; dielectric heating; and conduction heating.

9. The process of claim 6 including additionally heating the web with the aid of the following heating methods: microwave heating; induction heating; dielectric heating; and conduction heating.

10. The process of claim 7 including additionally heating the material with the aid of the following heating methods: microwave heating; induction heating; dielectric heating; and conduction heating.

References Cited
UNITED STATES PATENTS

| | | | |
|---|---|---|---|
| 1,757,948 | 5/1930 | Hockley | 34—122 |
| 2,319,174 | 5/1943 | Wilson | 34—122 X |
| 2,429,338 | 10/1947 | Adams | 34—122 |
| 2,753,766 | 7/1956 | Simpson | 34—115 |
| 3,096,161 | 7/1963 | Morrison et al. | 34—1 |
| 3,196,555 | 7/1965 | Friedal et al. | 34—115 |

FREDERICK L. MATTESON, JR., *Primary Examiner.*

J. J. CAMBY, *Assistant Examiner.*